US012421395B2

(12) United States Patent
Hamm et al.

(10) Patent No.: US 12,421,395 B2
(45) Date of Patent: Sep. 23, 2025

(54) EFFECT PIGMENTS

(71) Applicant: Susonity Commercial GmbH, Gernsheim (DE)

(72) Inventors: Lukas Hamm, Otzberg (DE); Carsten Griessmann, Gross-Zimmern (GB); Nicole Nelischer, Gross-Bieberau (DE); Marita Jekel, Darmstadt (DE)

(73) Assignee: Susonity Commercial GmbH (DE)

( * ) Notice: Subject to any disclaimer, the term of this patent is extended or adjusted under 35 U.S.C. 154(b) by 842 days.

(21) Appl. No.: 17/607,777

(22) PCT Filed: Apr. 28, 2020

(86) PCT No.: PCT/EP2020/061687
§ 371 (c)(1),
(2) Date: Oct. 29, 2021

(87) PCT Pub. No.: WO2020/221715
PCT Pub. Date: Nov. 5, 2020

(65) Prior Publication Data
US 2022/0220315 A1 Jul. 14, 2022

(30) Foreign Application Priority Data
Apr. 30, 2019 (DE) .................. 10 2019 003 072.9

(51) Int. Cl.
*C09C 1/00* (2006.01)

(52) U.S. Cl.
CPC .......... *C09C 1/0027* (2013.01); *C09C 1/0039* (2013.01); *C09C 1/0042* (2013.01); *C01P 2004/20* (2013.01); *C01P 2004/84* (2013.01); *C09C 2200/1004* (2013.01); *C09C 2200/102* (2013.01); *C09C 2200/1087* (2013.01); *C09C 2200/302* (2013.01); *C09C 2200/303* (2013.01); *C09C 2200/305* (2013.01); *C09C 2200/401* (2013.01)

(58) Field of Classification Search
CPC .... C09C 1/0027; C09C 1/0039; C09C 1/0042
See application file for complete search history.

(56) References Cited

U.S. PATENT DOCUMENTS

| | | |
|---|---|---|
| 3,087,828 A | 4/1963 | Linton |
| 3,087,829 A | 4/1963 | Linton |
| 3,553,001 A | 1/1971 | Kohlschutter et al. |
| 3,874,890 A | 4/1975 | Bernhard et al. |
| 3,926,659 A | 12/1975 | Bernhard et al. |
| 4,344,987 A | 8/1982 | Ostertag et al. |
| 4,456,486 A | 6/1984 | Bernhard et al. |
| 4,457,784 A | 7/1984 | Bernhard |
| 4,482,389 A | 11/1984 | Franz et al. |
| 4,490,179 A | 12/1984 | Bernhard |
| 4,494,993 A | 1/1985 | Bernhard et al. |
| 4,509,988 A | 4/1985 | Bernhard |
| 4,537,636 A | 8/1985 | Bernhard et al. |
| 4,544,415 A | 10/1985 | Franz et al. |
| 4,552,593 A | 11/1985 | Ostertag |
| 4,565,581 A | 1/1986 | Bernhard |
| 5,571,851 A | 11/1996 | Freeman et al. |
| 5,759,255 A | 6/1998 | Venturini et al. |
| 5,770,310 A * | 6/1998 | Noguchi ................ C09D 7/48 427/372.2 |
| 5,873,934 A | 2/1999 | Kunii et al. |
| 5,958,125 A | 9/1999 | Schmid et al. |
| 5,972,098 A | 10/1999 | Andes et al. |
| 6,417,250 B2 | 7/2002 | Kieser et al. |
| 6,579,355 B1 | 6/2003 | Schmidt et al. |
| 6,596,070 B1 | 7/2003 | Schmidt et al. |
| 6,599,355 B1 | 7/2003 | Schmidt et al. |
| 6,692,561 B1 | 2/2004 | Schoen et al. |
| 7,169,222 B2 | 1/2007 | Brückner et al. |
| 7,172,812 B2 | 2/2007 | Greiwe et al. |
| 2001/0031272 A1* | 10/2001 | Noguchi ................ A61K 8/11 424/59 |
| 2003/0097965 A1* | 5/2003 | Heider .................... A61Q 1/06 106/440 |
| 2004/0170838 A1 | 9/2004 | Ambrosius et al. |
| 2008/0279796 A1 | 11/2008 | Handrosch et al. |
| 2013/0108569 A1 | 5/2013 | Hochstein et al. |
| 2015/0166799 A1 | 6/2015 | Schoenefeld et al. |
| 2015/0259538 A1 | 9/2015 | Honeit et al. |
| 2017/0107379 A1 | 4/2017 | Hamm et al. |

FOREIGN PATENT DOCUMENTS

| | | | |
|---|---|---|---|
| CN | 101289580 A | 10/2008 | |
| CN | 113767151 B * | 7/2023 | ........... C03C 14/004 |
| DE | 1467468 A1 | 12/1968 | |
| DE | 1959988 A1 | 6/1971 | |
| DE | 2009566 B1 | 11/1971 | |
| DE | 2214545 A1 | 10/1972 | |
| DE | 2215191 A1 | 10/1972 | |
| DE | 2244298 A1 | 3/1974 | |
| DE | 2313331 A1 | 9/1974 | |
| DE | 2522572 A1 | 12/1976 | |
| DE | 3137808 A1 | 3/1983 | |
| DE | 3137809 A1 | 3/1983 | |
| DE | 3151343 A1 | 7/1983 | |
| DE | 3151354 A1 | 7/1983 | |

(Continued)

OTHER PUBLICATIONS

International Search Report International Application No. PCT/EP2020/061687, dated Aug. 3, 2020, 2 pages.

(Continued)

*Primary Examiner* — Sophie Hon
(74) *Attorney, Agent, or Firm* — Buchanan Ingersoll & Rooney PC

(57) ABSTRACT

Temperature-stable effect pigments based on multicoated flake-form substrates, and the use thereof in paints, coatings, printing inks, plastics and in particular in glazes, enamels, ceramic or glass-like materials.

17 Claims, No Drawings

(56) References Cited

FOREIGN PATENT DOCUMENTS

| | | | | |
|---|---|---|---|---|
| DE | 3151355 A1 | 7/1983 | | |
| DE | 3211602 A1 | 10/1983 | | |
| DE | 3235017 A1 | 3/1984 | | |
| DE | 3334598 A1 | 4/1985 | | |
| DE | 19618568 A1 | 11/1997 | | |
| DE | 19618569 A1 | 11/1997 | | |
| DE | 102006021784 A1 * | 11/2007 | ............... | A23L 5/42 |
| EP | 0045851 A1 | 2/1982 | | |
| EP | 0090259 A1 | 10/1983 | | |
| EP | 0106235 A1 | 4/1984 | | |
| EP | 0634459 A2 | 1/1995 | | |
| EP | 0659843 A2 | 6/1995 | | |
| EP | 0839167 A1 | 5/1998 | | |
| GB | 974874 A | 11/1964 | | |
| GB | 1287225 A | 8/1972 | | |
| GB | 1348878 A | 3/1974 | | |
| GB | 1359933 A | 7/1974 | | |
| GB | 1533430 A | 11/1978 | | |
| WO | 9632446 A1 | 10/1996 | | |
| WO | 9853011 A1 | 11/1998 | | |
| WO | 9920695 A1 | 4/1999 | | |
| WO | 9957204 A1 | 11/1999 | | |
| WO | 0192425 A2 | 12/2001 | | |

OTHER PUBLICATIONS

Written Opinion for International Application No. PCT/EP2020/061687, dated Aug. 3, 2020, 4 pages.

* cited by examiner

EFFECT PIGMENTS

CROSS-REFERENCE TO RELATED APPLICATIONS

This application is a U.S. national stage application filed and claiming priority under 35 U.S.C. §§ 120 and 365(a) of International Application No. PCT/EP2020/061687, filed Apr. 28, 2020, which claims priority under 35 U.S.C. § 119 of German Patent Application No. 10 2019 003 072.9, filed Apr. 30, 2019, each of which applications is incorporated herein by reference in its entirety and for all purposes.

BACKGROUND

The present invention relates to temperature-stable effect pigments based on multicoated flake-form substrates, and to the use thereof in paints, coatings, printing inks, plastics and in particular in glazes, enamels, ceramic or glass-like materials.

In general, mixtures of effect pigments, for example pearlescent pigments, and ceramic frits are employed for decorative applications in ceramic glazes. In particular on use for ceramic glazes in the high-temperature range above 900° C., in particular above 1000° C., just as are employed for the decoration of tiles, porcelain, fine china, bone china, sanitary products or cast ceramics, the problem occurs that the effect pigments do not withstand the aggressive conditions consisting of oxidic melt (frit components) and high temperatures during the firing process without damage.

The particularly intensely coloured effect pigments are frequently multilayered pigments which have an alternating sequence of oxide layers of different refractive index on a flake-form substrate. The oxides here are applied to a substrate in a certain sequence in order to generate a particular colour/effect. During the firing process, solid-state reactions can now occur between the individual oxide layers due to the high temperatures. The consequence is mixed-oxide formation and a change in the interference conditions, as a result of which gloss and colour change unintentionally during the firing operation. Particularly in the area of golden effect pigments, which are frequently already built up per se from mixed-oxide layers, there are no pigments which meet the said demands at high temperatures. The phenomena described mean that it is only possible to employ golden effect pigments to a limited extent, since they partly or completely lose colour and effect in the combination of high temperature and aggressive melt.

The golden multilayered pigments known from the prior art, as known, for example, from EP 0 839 167 B1, U.S. Pat. Nos. 6,692,561 B1, 6,599,355 B1, 6,579,355 B, US 2015/0259538 A1, U.S. Pat. No. 5,958,125 A, WO 98/53011, WO 99/20695, have the disadvantage that they are not temperature-stable at temperatures of >900° C. CN101289580 A discloses a gold pigment based on mica flakes, but this has the disadvantage that it has a relatively low chroma C* for a multilayered pigment.

SUMMARY

The object of the present invention is to find a temperature-stable and intensely coloured multilayered pigment, in particular an intensely coloured golden effect pigment, based on a flake-form substrate having a layer sequence which is distinguished by the fact that a phase reaction does not occur between the individual layers of the multilayered pigment at temperatures >800° C., preferably >900° C., in particular >1000° C. In addition, migration of the layers into the surrounding glass frit does not occur at the same time either. The layer package thus remains substantially unchanged during the firing operation. Only thus can it be ensured that the desired effect of the multilayered pigment, such as, for example, the pearlescent effect, the gloss and the intense colour, persists irrespective of the application, such as, for example, in the case of ceramic applications (cast ceramic, porcelain, sanitary ceramic or tiles and in other glazes where temperatures of >800° C. act on the effect pigment during the firing operation.

Surprisingly, it has been found that effect pigments based on flake-form substrates comprising two pseudobrookite layers which are separated from one another by a sufficiently thick separation layer are stable at temperatures of >800° C., since no or substantially no phase reactions occur between the individual layers of the multilayer system.

The present invention therefore relates to effect pigments based on flake-form substrates which have on the surface of the substrate at least one layer sequence (A) a high-refractive-index coating having a refractive index of $n \geq 1.8$ (B) a pseudobrookite layer, which may optionally be doped with one or more oxides in amounts of $\leq 10\%$ by weight, based on layer (B), (C) a low-refractive-index layer having a refractive index of $n < 1.8$ (D) a high-refractive-index layer having a refractive index of $n \geq 1.8$ consisting of at least two colourless metal-oxide layers (E) a pseudobrookite layer, which may optionally be doped with one or more oxides in amounts of $\leq 10\%$ by weight, based on layer (E), and optionally (F) an outer protective layer.

The effect pigments according to the invention are distinguished by very high temperature stability, high tinting strength, high hiding power and high gloss and are therefore suitable, in particular, for high-temperature applications, such as, for example, for use in glazes and ceramics.

The invention also relates to the use of the pigments according to the invention in paints, coatings, printing inks, security printing inks, plastics, as absorbers for laser marking and laser welding, in cosmetic formulations and in particular for high-temperature applications, such as, for example, for the pigmentation of glazes and ceramics. The pigments according to the invention are furthermore also suitable for the preparation of pigment preparations and for the preparation of dry preparations, such as, for example, ceramic colours, granules, chips, pellets, briquettes, etc. The dry preparations are suitable, in particular, for printing inks and paints.

DETAILED DESCRIPTION

Suitable base substrates for the effect pigments according to the invention are semitransparent and transparent flake-form substrates. Preferred substrates are phyllosilicate flakes, SiC, TiC, WC, $B_4C$, BN, graphite, $TiO_2$ and $Fe_2O_3$ flakes, doped or undoped $Al_2O_3$ flakes, doped or undoped glass flakes, doped or undoped $SiO_2$ flakes, $TiO_2$ flakes, BiOCl and mixtures thereof. From the group of the phyllosilicates, particular preference is given to natural and synthetic mica flakes, muscovite, talc and kaolin. The synthetic mica used as substrate is preferably fluorophlogopite or Zn phlogopite.

The glass flakes can consist of all types of glass known to the person skilled in the art, so long as they are temperature-stable in the firing range used. Suitable glasses are, for example, quartz, A glass, E glass, C glass, ECR glass, recycled glass, alkali metal borate glass, alkali metal silicate glass, borosilicate glass, Duran® glass, laboratory equipment glass or optical glass.

The refractive index of the glass flakes is preferably 1.45-1.80, in particular 1.50-1.70. The glass substrates particularly preferably consist of C glass, ECR glass or borosilicate glass.

Synthetic substrate flakes, such as, for example, glass flakes, $SiO_2$ flakes, $Al_2O_3$ flakes, may be doped or undoped. If they are doped, the doping is preferably Al, N, B, Ti, Zr, Si, In, Sn or Zn or mixtures thereof. Furthermore, further ions from the group of the transition metals (V, Cr, Mn, Fe, Co, Ni, Cu, Y, Nb, Mo, Hf, Sb, Ta, W) and ions from the group of the lanthanides can serve as dopants.

In the case of $Al_2O_3$, the substrate is preferably undoped or doped with $TiO_2$, $ZrO_2$ or ZnO. The $Al_2O_3$ flakes are preferably corundum. Suitable $Al_2O_3$ flakes are preferably doped or undoped $\alpha$-$Al_2O_3$ flakes, in particular $\alpha$-$Al_2O_3$ flakes doped with $TiO_2$ or $ZrO_2$.

If the substrate is doped, the proportion of the doping is preferably 0.01-5% by weight, in particular 0.10-3% by weight, based on the substrate.

The size of the base substrates is not crucial per se and can be matched to the particular application. In general, the flake-form substrates have a thickness between 0.05 and 5 µm, in particular between 0.1 and 4.5 µm.

It is also possible to employ substrates having different particle sizes. Particular preference is given to a mixture of mica fractions of mica N (10-60 µm), mica F (5-20 µm) and/or mica M (<15 µm). Preference is furthermore given to N and S fractions (10-130 µm) and F and S fractions (5-130 µm).

Typical examples of particle-size distributions (measured using a Malvern Mastersizer 2000):

$D_{10}$: 1-50 µm, in particular 2-45 µm, very particularly preferably 5-40 µm $D_{50}$: 7-275 µm, in particular 10-200 µm, very particularly preferably 15-150 µm $D_{90}$: 15-500 µm, in particular 25-400 µm, very particularly preferably 50-200 µm.

In this patent application, "high-refractive-index" means a refractive index of $\geq 1.8$, while "low-refractive-index" means a refractive index of <1.8.

The layer sequence (A)-(E) or (A)-(F) of the effect pigment according to the invention is essential for the stability of the pigment and the optical properties.

Layer (A) is a high-refractive-index layer having a refractive index of $n \geq 1.8$, preferably $n \geq 2.0$. Layer (A) may be colourless or absorbent in the visible wave light. Layer (A) preferably consists of metal oxides or metal-oxide mixtures. The metal oxide is preferably selected from the group $TiO_2$, $ZrO_2$, ZnO, $SnO_2$, $Cr_2O_3$, $Ce_2O_3$, BiOCl; $Fe_2O_3$, $Fe_3O_4$, FeO(OH), Ti sub-oxides (partly reduced $TiO_2$ having oxidation states from <4 to 2 and lower oxides, such as, for example, $Ti_3O_5$, $Ti_2O_3$ up to TiO), titanium oxynitrides and titanium nitride, CoO, $Co_2O_3$, $Co_3O_4$, $VO_2$, $V_2O_3$, NiO, $WO_3$, MnO, $Mn_2O_3$ or mixtures of the said oxides. Layer (A) preferably consists of $TiO_2$, $Fe_2O_3$, $Cr_2O_3$ or $SnO_2$.

Layer (A) preferably has layer thicknesses of 1-15 nm, in particular of 1-10 nm and very particularly preferably of 1-5 nm.

The pseudobrookite layers (B) and (E) may be identical or different. The layers are preferably identical in terms of composition. The pseudobrookite layers preferably consist entirely of $Fe_2TiO_5$. However, the $Fe_2TiO_5$ may be slightly super- or substoichiometric due to slight variations of the Fe/Ti ratio and resultant lattice vacancies.

The layers can be produced by simultaneous addition and precipitation of an Fe-containing salt solution and a Ti-containing salt solution or by co-precipitation from a single solution containing Fe and Ti salts.

The pseudobrookite layers should preferably consist of 100% of crystalline pseudobrookite.

Layers (B) and (E) and may optionally additionally be doped with one or more oxides or oxide mixtures, preferably metal oxides, in order to increase the stability and/or tinting strength. The oxides are preferably selected from the group $Al_2O_3$, $Ce_2O_3$, $B_2O_3$, $ZrO_2$, $SnO_2$, $Cr_2O_3$, CoO, $Co_2O_3$, $Co_3O_4$, $Mn_2O_3$. The proportion by weight of the oxide or oxide mixture in the pseudobrookite layer is preferably not more than 5% by weight and is in particular in the range 1-5% by weight, very particularly preferably 1-3% by weight, based on layer (B) or layer (E).

Layers (B) and (E) preferably each, independently of one another, have layer thicknesses in the range 60-120 nm, in particular 70-110 nm, and very particularly preferably 80-100 nm.

It is particularly important for the stability of the effect pigments according to the invention that layers (B) and (E) are separated from one another by a separation layer (C) and a separation layer (D). The distance between layers (B) and (E) should preferably be 40-100 nm, in particular 45-90 nm and very particularly preferably 50-80 nm.

The low-refractive-index layer (C) having a refractive index of n<1.8, preferably n<1.7, preferably consists of $SiO_2$, $MgO*SiO_2$, $CaO*SiO_2$, $Al_2O_3*SiO_2$, $B_2O_3*SiO_2$ or of a mixture of the said compounds. Furthermore, the silicate layer may be doped with further alkaline-earth metal or alkali-metal ions. Layer (C) is preferably a "silicate" layer. Layer (C) very particularly preferably consists of doped or undoped $SiO_2$.

Layer (C) preferably has layer thicknesses of 40-90 nm, in particular of 40-70 nm and very particularly preferably of 50-60 nm.

The high-refractive-index coating of layer (D) having a refractive index of $n \geq 1.8$, preferably $n \geq 2.0$, consists of at least two colourless metal-oxide layers. Layer (D) preferably consists of 2 or 3 colourless metal-oxide layers. The metal oxides are preferably selected from the group $SnO_2$, $TiO_2$, $Al_2O_3$, $Fe_2O_3$, $Cr_2O_3$ or mixtures thereof.

The coating of layer (D) preferably consists of metal-oxide layers (D1) and (D2)

(D1) $SnO_2$ layer
(D2) $TiO_2$ layer
or
of metal-oxide layers (D1), (D2) and (D3)
(D1) $Al_2O_3$ layer
(D2) $TiO_2$ layer
(D3) $Al_2O_3$ layer
or
(D1) $SnO_2$ layer
(D2) $TiO_2$ layer
(D3) $SnO_2$ layer.

The coating of layer (D) preferably has layer thicknesses of 10-25 nm, in particular of 11-21 nm and very particularly preferably of 12-17 nm. The sum of all layer thicknesses of the individual metal-oxide layers (D1), (D2), (D3) and any further layers of the coating of layer (D) should not exceed 25 nm.

In order that layers (C) and (D) are able to act as separation layers and thus contribute to the reduced phase reaction between the individual pseudobrookite layers (B) and (E), the total layer thickness of layers (C) and (D) should not exceed the thickness range of 120 nm and should preferably be in the range 50-115 nm, in particular 51-91 nm and very particularly preferably 62-77 nm.

If layer (A) or (D) consists of $TiO_2$, the $TiO_2$ can be in the rutile or anatase modification.

Particularly preferred effect pigments have the following structure:

substrate+$TiO_2$+pseudobrookite+$SiO_2$+$SnO_2$+$TiO_2$+$SnO_2$+pseudobrookite
substrate+$Fe_2O_3$+pseudobrookite+$SiO_2$+$SnO_2$+$TiO_2$+$SnO_2$+pseudobrookite
substrate+$Cr_2O_3$+pseudobrookite+$SiO_2$+$SnO_2$+$TiO_2$+$SnO_2$+pseudobrookite
substrate+$TiO_2$+pseudobrookite+$MgO*SiO_2$+$SnO_2$+$TiO_2$+$SnO_2$+pseudobrookite
substrate+$Fe_2O_3$+pseudobrookite+$MgO*SiO_2$+$SnO_2$+$TiO_2$+$SnO_2$+pseudobrookite
substrate+$Cr_2O_3$+pseudobrookite+$MgO*SiO_2$+$SnO_2$+$TiO_2$+$SnO_2$+pseudobrookite
substrate+$TiO_2$+pseudobrookite+$CaO*SiO_2$+$SnO_2$+$TiO_2$+$SnO_2$+pseudobrookite
substrate+$Fe_2O_3$+pseudobrookite+$CaO*SiO_2$+$SnO_2$+$TiO_2$+$SnO_2$+pseudobrookite
substrate+$Cr_2O_3$+pseudobrookite+$CaO*SiO_2$+$SnO_2$+$TiO_2$+$SnO_2$+pseudobrookite
substrate+$TiO_2$+pseudobrookite+$Al_2O_3*SiO_2$+$SnO_2$+$TiO_2$+$SnO_2$+pseudobrookite
substrate+$Fe_2O_3$+pseudobrookite+$Al_2O_3*SiO_2$+$SnO_2$+$TiO_2$+$SnO_2$+pseudobrookite
substrate+$Cr_2O_3$+pseudobrookite+$Al_2O_3*SiO_2$+$SnO_2$+$TiO_2$+$SnO_2$+pseudobrookite
substrate+$TiO_2$+pseudobrookite+$SiO_2$+$TiO_2$+$SnO_2$+pseudobrookite
substrate+$TiO_2$+pseudobrookite+$SiO_2$+$SnO_2$+$TiO_2$+pseudobrookite
substrate+$TiO_2$+pseudobrookite+$SiO_2$+$TiO_2$+$SnO_2$+pseudobrookite+$SnO_2$
substrate+$TiO_2$+pseudobrookite+$SiO_2$+$SnO_2$+$TiO_2$+pseudobrookite+$SnO_2$
substrate+$TiO_2$+pseudobrookite+$SiO_2$+$SnO_2$+$Fe_2O_3$+$SnO_2$+pseudobrookite
substrate+$TiO_2$+pseudobrookite+$SiO_2$+$SnO_2$+$Cr_2O_3$+$SnO_2$+pseudobrookite
substrate+$TiO_2$+pseudobrookite+$SiO_2$+$Al_2O_3$+$TiO_2$+$Al_2O_3$+pseudobrookite Very particularly preferred effect pigments have the following layer structure:

natural mica flakes+$TiO_2$+pseudobrookite+$SiO_2$+$SnO_2$+$TiO_2$+$SnO_2$+pseudobrookite
natural mica flakes+$Fe_2O_3$+pseudobrookite+$SiO_2$+$SnO_2$+$TiO_2$+$SnO_2$+pseudobrookite
natural mica flakes+$Cr_2O_3$+pseudobrookite+$SiO_2$+$SnO_2$+$TiO_2$+$SnO_2$+pseudobrookite
natural mica flakes+$TiO_2$+pseudobrookite+$MgO*SiO_2$+$SnO_2$+$TiO_2$+$SnO_2$+pseudobrookite
natural mica flakes+$Fe_2O_3$+pseudobrookite+$MgO*SiO_2$+$SnO_2$+$TiO_2$+$SnO_2$+pseudobrookite
natural mica flakes+$Cr_2O_3$+pseudobrookite+$MgO*SiO_2$+$SnO_2$+$TiO_2$+$SnO_2$+pseudobrookite
natural mica flakes+$TiO_2$+pseudobrookite+$CaO*SiO_2$+$SnO_2$+$TiO_2$+$SnO_2$+pseudobrookite
natural mica flakes+$Fe_2O_3$+pseudobrookite+$CaO*SiO_2$+$SnO_2$+$TiO_2$+$SnO_2$+pseudobrookite
natural mica flakes+$Cr_2O_3$+pseudobrookite+$CaO*SiO_2$+$SnO_2$+$TiO_2$+$SnO_2$+pseudobrookite
natural mica flakes+$TiO_2$+pseudobrookite+$Al_2O_3*SiO_2$+$SnO_2$+$TiO_2$+$SnO_2$+pseudobrookite
natural mica flakes+$Fe_2O_3$+pseudobrookite+$Al_2O_3*SiO_2$+$SnO_2$+$TiO_2$+$SnO_2$+pseudobrookite
natural mica flakes+$Cr_2O_3$+pseudobrookite+$Al_2O_3*SiO_2$+$SnO_2$+$TiO_2$+$SnO_2$+pseudobrookite
natural mica flakes+$TiO_2$+pseudobrookite+$SiO_2$+$TiO_2$+$SnO_2$+pseudobrookite
natural mica flakes+$TiO_2$+pseudobrookite+$SiO_2$+$SnO_2$+$TiO_2$+pseudobrookite
natural mica flakes+$TiO_2$+pseudobrookite+$SiO_2$+$TiO_2$+$SnO_2$+pseudobrookite+$SnO_2$
natural mica flakes+$TiO_2$+pseudobrookite+$SiO_2$+$SnO_2$+$TiO_2$+pseudobrookite+$SnO_2$
natural mica flakes+$TiO_2$+pseudobrookite+$SiO_2$+$SnO_2$+$Fe_2O_3$+$SnO_2$+pseudobrookite
natural mica flakes+$TiO_2$+pseudobrookite+$SiO_2$+$SnO_2$+$Cr_2O_3$+$SnO_2$+pseudobrookite
natural mica flakes+$TiO_2$+pseudobrookite+$SiO_2$+$Al_2O_3$+$TiO_2$+$Al_2O_3$+pseudobrookite
synthetic mica flakes+$TiO_2$+pseudobrookite+$SiO_2$+$SnO_2$+$TiO_2$+$SnO_2$+pseudobrookite
synthetic mica flakes+$Fe_2O_3$+pseudobrookite+$SiO_2$+$SnO_2$+$TiO_2$+$SnO_2$+pseudobrookite
synthetic mica flakes+$Cr_2O_3$+pseudobrookite+$SiO_2$+$SnO_2$+$TiO_2$+$SnO_2$+pseudobrookite
synthetic mica flakes+$TiO_2$+pseudobrookite+$MgO*SiO_2$+$SnO_2$+$TiO_2$+$SnO_2$+pseudobrookite
synthetic mica flakes+$Fe_2O_3$+pseudobrookite+$MgO*SiO_2$+$SnO_2$+$TiO_2$+$SnO_2$+pseudobrookite
synthetic mica flakes+$Cr_2O_3$+pseudobrookite+$MgO*SiO_2$+$SnO_2$+$TiO_2$+$SnO_2$+pseudobrookite
synthetic mica flakes+$TiO_2$+pseudobrookite+$CaO*SiO_2$+$SnO_2$+$TiO_2$+$SnO_2$+pseudobrookite
synthetic mica flakes+$Fe_2O_3$+pseudobrookite+$CaO*SiO_2$+$SnO_2$+$TiO_2$+$SnO_2$+pseudobrookite
synthetic mica flakes+$Cr_2O_3$+pseudobrookite+$CaO*SiO_2$+$SnO_2$+$TiO_2$+$SnO_2$+pseudobrookite
synthetic mica flakes+$TiO_2$+pseudobrookite+$Al_2O_3*SiO_2$+$SnO_2$+$TiO_2$+$SnO_2$+pseudobrookite
synthetic mica flakes+$Fe_2O_3$+pseudobrookite+$Al_2O_3*SiO_2$+$SnO_2$+$TiO_2$+$SnO_2$+pseudobrookite
synthetic mica flakes+$Cr_2O_3$+pseudobrookite+$Al_2O_3*SiO_2$+$SnO_2$+$TiO_2$+$SnO_2$+pseudobrookite
synthetic mica flakes+$TiO_2$+pseudobrookite+$SiO_2$+$TiO_2$+$SnO_2$+pseudobrookite
synthetic mica flakes+$TiO_2$+pseudobrookite+$SiO_2$+$SnO_2$+$TiO_2$+pseudobrookite
synthetic mica flakes+$TiO_2$+pseudobrookite+$SiO_2$+$TiO_2$+$SnO_2$+pseudobrookite+$SnO_2$
synthetic mica flakes+$TiO_2$+pseudobrookite+$SiO_2$+$SnO_2$+$TiO_2$+pseudobrookite+$SnO_2$
synthetic mica flakes+$TiO_2$+pseudobrookite+$SiO_2$+$SnO_2$+$Fe_2O_3$+$SnO_2$+pseudobrookite
synthetic mica flakes+$TiO_2$+pseudobrookite+$SiO_2$+$SnO_2$+$Cr_2O_3$+$SnO_2$+pseudobrookite
synthetic mica flakes+$TiO_2$+pseudobrookite+$SiO_2$+$Al_2O_3$+$TiO_2$+$Al_2O_3$+pseudobrookite
$Al_2O_3$ flakes+$TiO_2$+pseudobrookite+$SiO_2$+$SnO_2$+$TiO_2$+$SnO_2$+pseudobrookite
$Al_2O_3$ flakes+$Fe_2O_3$+pseudobrookite+$SiO_2$+$SnO_2$+$TiO_2$+$SnO_2$+pseudobrookite
$Al_2O_3$ flakes+$Cr_2O_3$+pseudobrookite+$SiO_2$+$SnO_2$+$TiO_2$+$SnO_2$+pseudobrookite $Al_2O_3$ flakes+$TiO_2$+pseudobrookite+MgO*$SiO_2$+$SnO_2$+$TiO_2$+$SnO_2$+pseudobrookite $Al_2O_3$ flakes+$Fe_2O_3$+pseudobrookite+MgO*$SiO_2$+$SnO_2$+$TiO_2$+$SnO_2$+pseudobrookite $Al_2O_3$ flakes+$Cr_2O_3$+pseudobrookite+MgO*$SiO_2$+$SnO_2$+$TiO_2$+$SnO_2$+pseudobrookite $Al_2O_3$ flakes+$TiO_2$+pseudobrookite+CaO*$SiO_2$+$SnO_2$+$TiO_2$+$SnO_2$+pseudobrookite $Al_2O_3$ flakes+$Fe_2O_3$+pseudobrookite+CaO*$SiO_2$+$SnO_2$+$TiO_2$+$SnO_2$+pseudobrookite $Al_2O_3$ flakes+$Cr_2O_3$+pseudobrookite+CaO*$SiO_2$+$SnO_2$+$TiO_2$+$SnO_2$+pseudobrookite $Al_2O_3$ flakes+$TiO_2$+pseudobrookite+$Al_2O_3$*$SiO_2$+$SnO_2$+$TiO_2$+$SnO_2$+pseudobrookite $Al_2O_3$ flakes+$Fe_2O_3$+pseudobrookite+$Al_2O_3$*$SiO_2$+$SnO_2$+$TiO_2$+$SnO_2$+pseudobrookite $Al_2O_3$ flakes+$Cr_2O_3$+pseudobrookite+$Al_2O_3$*$SiO_2$+$SnO_2$+$TiO_2$+$SnO_2$+pseudobrookite $Al_2O_3$ flakes+$TiO_2$+pseudobrookite+$SiO_2$+$TiO_2$+$SnO_2$+pseudobrookite $Al_2O_3$ flakes+$TiO_2$+pseudobrookite+$SiO_2$+$SnO_2$+$TiO_2$+pseudobrookite $Al_2O_3$ flakes+$TiO_2$+pseudobrookite+$SiO_2$+$TiO_2$+$SnO_2$+pseudobrookite+$SnO_2$ $Al_2O_3$ flakes+$TiO_2$+pseudobrookite+$SiO_2$+$SnO_2$+$TiO_2$+pseudobrookite+$SnO_2$ $Al_2O_3$ flakes+$TiO_2$+pseudobrookite+$SiO_2$+$SnO_2$+$Fe_2O_3$+$SnO_2$+pseudobrookite $Al_2O_3$ flakes+$TiO_2$+pseudobrookite+$SiO_2$+$SnO_2$+$Cr_2O_3$+$SnO_2$+pseudobrookite $Al_2O_3$ flakes+$TiO_2$+pseudobrookite+$SiO_2$+$Al_2O_3$+$TiO_2$+$Al_2O_3$+pseudobrookite $SiO_2$ flakes+$TiO_2$+pseudobrookite+$SiO_2$+$SnO_2$+$TiO_2$+$SnO_2$+pseudobrookite $SiO_2$ flakes+$Fe_2O_3$+pseudobrookite+$SiO_2$+$SnO_2$+$TiO_2$+$SnO_2$+pseudobrookite $SiO_2$ flakes+$Cr_2O_3$+pseudobrookite+$SiO_2$+$SnO_2$+$TiO_2$+$SnO_2$+pseudobrookite $SiO_2$ flakes+$TiO_2$+pseudobrookite+$SiO_2$+$SnO_2$+$TiO_2$+$SnO_2$+pseudobrookite $SiO_2$ flakes+$Fe_2O_3$+pseudobrookite+MgO*$SiO_2$+$SnO_2$+$TiO_2$+$SnO_2$+pseudobrookite $SiO_2$ flakes+$Cr_2O_3$+pseudobrookite+MgO*$SiO_2$+$SnO_2$+$TiO_2$+$SnO_2$+pseudobrookite $SiO_2$ flakes+$TiO_2$+pseudobrookite+CaO*$SiO_2$+$SnO_2$+$TiO_2$+$SnO_2$+pseudobrookite $SiO_2$ flakes+$Fe_2O_3$+pseudobrookite+CaO*$SiO_2$+$SnO_2$+$TiO_2$+$SnO_2$+pseudobrookite $SiO_2$ flakes+$Cr_2O_3$+pseudobrookite+CaO*$SiO_2$+$SnO_2$+$TiO_2$+$SnO_2$+pseudobrookite $SiO_2$ flakes+$TiO_2$+pseudobrookite+$Al_2O_3$*$SiO_2$+$SnO_2$+$TiO_2$+$SnO_2$+pseudobrookite $SiO_2$ flakes+$Fe_2O_3$+pseudobrookite+$Al_2O_3$*$SiO_2$+$SnO_2$+$TiO_2$+$SnO_2$+pseudobrookite $SiO_2$ flakes+$Cr_2O_3$+pseudobrookite+$Al_2O_3$*$SiO_2$+$SnO_2$+$TiO_2$+$SnO_2$+pseudobrookite $SiO_2$ flakes+$TiO_2$+pseudobrookite+$SiO_2$+$TiO_2$+$SnO_2$+pseudobrookite $SiO_2$ flakes+$TiO_2$+pseudobrookite+$SiO_2$+$SnO_2$+$TiO_2$+pseudobrookite $SiO_2$ flakes+$TiO_2$+pseudobrookite+$SiO_2$+$SnO_2$+$TiO_2$+pseudobrookite+$SnO_2$ $SiO_2$ flakes+$TiO_2$+pseudobrookite–$SiO_2$+$SnO_2$+$TiO_2$+pseudobrookite+$SnO_2$ $SiO_2$ flakes+$TiO_2$+pseudobrookite+$SiO_2$+$SnO_2$+$Fe_2O_3$+$SnO_2$+pseudobrookite $SiO_2$ flakes+$TiO_2$+pseudobrookite+$SiO_2$+$SnO_2$+$Cr_2O_3$+$SnO_2$+pseudobrookite $SiO_2$ flakes+$TiO_2$+pseudobrookite+$SiO_2$+$Al_2O_3$+$TiO_2$+$Al_2O_3$+pseudobrookite, where the $SiO_2$ and $Al_2O_3$ flakes may be either doped or undoped. The $Al_2O_3$ flakes are preferably doped. The $SiO_2$ flakes are preferably undoped.

The metal-oxide layer(s) are preferably applied by wet-chemical methods, it being possible to use the wet-chemical coating methods developed for the preparation of pearlescent pigments; methods of this type are described, for example, in U.S. Pat Nos. 3,087,828, 3,087,829, 3,553,001, DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017, DE 196 18 568, EP 0 659 843, or also in further patent documents and other publications known to the person skilled in the art.

In the case of wet coating, the substrate flakes are suspended in water, and one or more hydrolysable metal salts are added at a pH which is suitable for hydrolysis, which is selected so that the metal oxides or metal oxide hydrates are precipitated directly onto the flakes without secondary precipitations occurring. The pH is usually kept constant by simultaneous metered addition of a base and/or acid. The effect pigments are subsequently separated off, washed and dried and optionally calcined, where the calcination temperature can be optimised with respect to the coating present in each case. In general, the calcination temperatures are between 250 and 1000° C., preferably between 350 and 900° C. If desired, the pigment can be separated off, dried and optionally calcined after the application of individual coatings and then re-suspended again for the precipitation of the further layers.

For the application of an $SiO_2$ layer, the process described in DE 196 18 569 is preferably used. For the production of the $SiO_2$ layer, sodium water-glass solution or potassium water-glass solution is preferably employed.

Furthermore, the coating can also be carried out by gas-phase coating in a fluidised-bed reactor, where, for example, the processes proposed for the preparation of pearlescent pigments in EP 0 045 851 and EP 0 106 235 can be used correspondingly.

The hue of the pigments can be varied in broad limits by different choice of the coating amounts or of the resultant layer thicknesses. Fine tuning for a certain hue can be achieved beyond the pure choice of amounts by approaching the desired colour with visual or measurement technology control.

In order to increase the light, water and weather stability, it is frequently advisable to subject the effect pigment according to the invention, depending on the area of application, to inorganic or organic post-coating or post-treatment (layer (F)). Suitable post-coatings or post-treatments are, for example, the methods described in German patent 22 15 191, DE-A 31 51 354, DE-A 32 35 017 or DE-A 33 34 598. This post-coating further increases the chemical and photochemical stability or simplifies handling of the effect pigment, in particular incorporation into various media. In order to improve the wettability, dispersibility and/or compatibility with the user media, functional coatings of $SnO_2$, $Al_2O_3$ or $ZrO_2$ or mixtures thereof can be applied to the pigment surface. Furthermore, organic post-coatings are possible, for example with silanes, as described, for example, in EP 0090259, EP 0 634 459, WO 99/57204, WO 96/32446, WO 99/57204, U.S. Pat. Nos. 5,759,255, 5,571,851, WO 01/92425 or in J. J. Ponjeé, Philips Technical Review, Vol.

44, No. 3, 81 ff. and P. H. Harding J. C. Berg, J. Adhesion Sci. Technol. Vol. 11 No. 4, pp. 471-493. Layer (F) is preferably a layer of $SnO_2$.

Coating(s) in this patent application are taken to mean the complete covering/sheathing of the flake-form substrates.

The effect pigments according to the invention have increased temperature and heat stability compared with the unstabilised effect pigments. The stabilised effect pigments can be incorporated without problems into engobes and glazes. The glazes can be matt to glossy, or transparent to opaque, depending on the desired effect.

The effect pigments according to the invention are furthermore suitable for the preparation of flowable pigment preparations and dry preparations, in particular for printing inks and paints, preferably automotive paints, consisting of the pigments according to the invention, binders and optionally one or more additives.

The effect pigment according to the invention is compatible with a multiplicity of colour systems, Pref from the area of paints, coatings and printing inks. For the preparation of printing inks for, for example, gravure printing, flexographic printing, offset printing, offset overprint varnishing, a multiplicity of binders, in particular water-soluble types, is suitable, as marketed, for example, by BASF, Marabu, Pröll, Sericol, Hartmann, Gebr. Schmidt, Sicpa, Aarberg, Siegwerk, GSB-Wahl, Follmann, Ruco or Coates Screen INKS GmbH. The printing inks can be built up on a water basis or solvent basis.

The effect pigment according to the invention is suitable for decorative cosmetics and personal care applications, such as, for example, nail varnishes, lipsticks, compact powders, gels, lotions, soaps, toothpastes, body lotions, emotions, soaps, shampoos, BB creams, CC creams, make-up, foundations, mascara, hair, eyelash and eyebrow products, etc., but also in paints, in industrial coatings and powder coatings, and in plastics and in ceramics.

In decorative cosmetics, the effect pigment according to the invention is preferably employed in concentrations of 0.5-25% by weight, in particular 1-20% by weight, and very particularly preferably 1-10% by weight, based on the formulation. In the case of cosmetic formulations for personal care applications, the effect pigment according to the invention is preferably employed in concentrations of 0.1-5% by weight, and very particularly preferably 0.5-4% by weight, based on the formulation.

It goes without saying that, for the various applications, the effect pigment according to the invention can also advantageously be employed in a mixture with, for example,
  metal-effect pigments, for example based on iron flakes or aluminium flakes;
  pearlescent pigments based on metal-oxide-coated synthetic mica flakes, natural mica flakes, glass flakes, $Al_2O_3$ flakes, $Fe_2O_3$ flakes or $SiO_2$ flakes;
  absorption pigments;
  goniochromatic pigments;
  multilayered pigments (preferably containing 2, 3, 4, 5 or 7 layers) based on metal-oxide-coated synthetic mica flakes, natural mica flakes, glass flakes, $Al_2O_3$ flakes, $Fe_2O_3$ flakes or $SiO_2$ flakes;
  organic dyes;
  organic pigments;
  inorganic pigments, such as, for example, transparent and opaque white, coloured and black pigments; in particular temperature-stable ceramic pigments;
  flake-form iron oxides;
  carbon black;
  ceramic colour bodies;
  functional pigments, for example IR-reflective or electroconductive pigments.

The effect pigment according to the invention can be mixed in any ratio with commercially available pigments and/or further commercially available fillers.

Commercially available fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, boron nitride and physical or chemical combinations of these substances. There are no restrictions regarding the particle shape of the filler. In accordance with requirements, it can be, for example, flake-form, spherical or needle-shaped.

The effect pigment according to the invention can of course also be combined in the formulations with cosmetic raw materials and assistants of any type. These include, inter alia, oils, fats, waxes, film formers, preservatives and assistants which generally determine the applicational properties, such as, for example, thickeners and rheological additives, such as, for example, bentonites, hectorites, silicon dioxides, Ca silicates, gelatins, high-molecular-weight carbohydrates and/or surface-active assistants, etc.

The formulation comprising the effect pigment according to the invention can belong to the lipophilic, hydrophilic or hydrophobic type. In the case of heterogeneous formulations having discrete aqueous and non-aqueous phases, the effect pigment according to the invention may be present in only one of the two phases in each case or also distributed over both phases.

The pH values of the formulations can be between 1 and 14, preferably between 2 and 11 and particularly preferably between 4 and 10.

No limits are set for the concentrations of the effect pigment according to the invention in the formulation. They can be—depending on the application—between 0.001 (rinse-off products, for example shower gels)—and 60%. The effect pigment according to the invention can furthermore also be combined with cosmetic active compounds. Suitable active compounds are, for example, insect repellents, inorganic UV filters, such as, for example, $TiO_2$, UV NBC protection filters (for example OMC, B3, MBC), also in encapsulated form, anti-ageing active compounds, vitamins and derivatives thereof (for example vitamin A, C, E, etc.), self tanners (for example DHA, erytrolose, inter alia) and further cosmetic active compounds, such as, for example, bisabolol, LPO, ectoin, emblica, allantoin, bioflavanoids and derivatives thereof.

Organic UV filters are generally employed in an amount of 0.5-10% by weight, preferably 1-8% by weight, inorganic UV filters in an amount of 0.1-30% by weight, based on the formulation.

The formulations may, in addition, comprise further conventional skin-protecting or skin-care active compounds, such as, for example, aloe vera, avocado oil, coenzyme Q10, green tea extract and also active compound complexes.

The present invention likewise relates to formulations, in particular formulations which, besides the effect pigment according to invention, comprise at least one constituent selected from the group of the absorbents, astringents, antimicrobial substances, antioxidants, antiperspirants, anti-foaming agents, antidandruff active compounds, antistatics, binders, biological additives, bleaches, chelating agents, deodorisers, emollients, emulsifiers, emulsion stabilisers, dyes, humectants, film formers, fillers, fragrances, flavours, insect repellents, preservatives, corrosion-protection agents, cosmetic oils, solvents, oxidants, plant constituents, buffer substances, reducing agents, surfactants, propellant gases, opacifiers, UV filters and UV absorbers, denaturing agents, aloe vera, avocado oil, coenzyme Q10, green tea extract, viscosity regulators, perfume, inorganic pigments, such as, for example, transparent or opaque white, coloured and black pigments, metal pigments, temperature-stable ceramic pigments, ceramic colour bodies, functional pigments, such as, for example, IR-reflective pigments or electroconductive pigments, and vitamins.

The invention furthermore relates to the use of the effect pigments according to the invention in paints, coatings, printing inks, security printing inks, plastics, ceramic materials, glasses, glazes, as tracers, as absorbers for the laser marking of plastics and papers and in cosmetic formulations. The pigments according to the invention are furthermore also suitable for the preparation of pigment preparations and for the preparation of dry preparations, such as, for example, granules, chips, pellets, briquettes, etc. The dry preparations are suitable, in particular, for paints and printing inks.

The invention furthermore also relates to formulations, such as, for example, ceramic colours, coatings, tiles, cast ceramics, sanitary ceramics, enamels, glazes, clay, glass and ceramic products, which comprise the effect pigment according to the invention.

The following examples are intended to explain the invention, but without limiting it. Unless indicated otherwise, per cent numbers relate to per cent by weight.

EXAMPLES

Example 1

100 g of natural mica having a particle size of 10-60 µm are heated to 80° C. in 2 l of demineralised water with stirring. When this temperature has been reached, 44 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 600 ml of an aqueous $FeCl_3$ solution (w(Fe)=7%) and 462 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. This is then followed by a further addition of a solution consisting of 5 g of $SnCl_4 \times 5\ H_2O$ and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the coated mica substrate is filtered off, washed and dried at 110° C. for 16 h. Finally, the effect pigment obtained is calcined at 850° C. for 0.5 h and sieved.

A temperature-stable golden multilayered pigment having high brightness is obtained.

Example 2

100 g of natural mica having a particle size of 10-25 µm are heated to 80° C. in 2 l of demineralised water with stirring. When this temperature has been reached, 44 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 600 ml of an aqueous $FeCl_3$ solution (w(Fe)=7%) and 462 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. This is then followed by a further addition of a solution consisting of 5 g of $SnCl_4 \times 5\ H_2O$ and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the coated mica substrate is filtered off, washed and dried at 110° C. for 16 h. Finally, the effect pigment obtained in this way is calcined at 850° C. for 0.5 h and sieved.

A temperature-stable golden multilayered pigment having high brightness and good hiding power is obtained.

Example 3

100 g of natural mica having a particle size of 20-180 µm are heated to 80° C. in 2 l of demineralised water with stirring. When this temperature has been reached, 38 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 508 ml of an aqueous $FeCl_3$ solution (w(Fe)=7%) and 431 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. A further addition of a solution consisting of 5 g of $SnCl_4 \times 5\ H_2O$ and 41 ml of hydrochloric acid (20%) is subsequently carried out. The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the coated mica substrate is filtered off, washed and dried at 110° C. for 16 h. Finally, the effect pigment is calcined at 850° C. for 0.5 h and sieved.

A temperature-stable golden multilayered pigment having a strong glitter effect is obtained.

Example 4

100 g of natural mica having a particle size <15 μm are heated to 80° C. in 2 l of demineralised water with stirring. When this temperature has been reached, 53 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 640 ml of an aqueous $FeCl_3$ solution (w(Fe)=7%) and 501 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. This is then followed by a further addition of a solution consisting of 5 g of $SnCl_4 \times 5\ H_2O$ and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the coated mica substrate is filtered off, washed and dried at 110° C. for 16 h. Finally, the effect pigment obtained in this way is calcined at 850° C. for 0.5 h and then sieved.

A temperature-stable golden multilayered pigment having high hiding power is obtained.

Example 5

100 g of $Al_2O_3$ flakes having a particle size of 5-30 μm are heated to 80° C. in 2 l of demineralised water with stirring. When this temperature has been reached, 44 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 600 ml of an aqueous $FeCl_3$ solution (w(Fe)=7%) and 462 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. A further addition of a solution consisting of 5 g of $SnCl_4 \times 5\ H_2O$ and 41 ml of hydrochloric acid (20%) is subsequently carried out. The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the $Al_2O_3$ flakes coated in this way are filtered off, washed and dried at 110° C. for 16 h. Finally, the effect pigment obtained is calcined at 850° C. for 0.5 h and sieved.

A temperature-stable golden multilayered pigment having a strong glitter effect is obtained.

Example 6

100 g of borosilcate glass flakes having a particle size of 20-200 μm are heated to 80° C. in 2 l of demineralised water with stirring. When this temperature has been reached, 38 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 508 ml of an aqueous $FeCl_3$ solution (w(Fe)=7%) and 431 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. This is then followed by a further addition of a solution consisting of 5 g of $SnCl_4 \times 5\ H_2O$ and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the glass flakes coated in this way are filtered off, washed and dried at 110° C. for 16 h. Finally, the effect pigment is calcined at 850° C. for 0.5 h and sieved.

A temperature-stable golden multilayered pigment having a very strong glitter effect is obtained.

Example 7

100 g of $SiO_2$ flakes having a particle size of 10-40 μm are heated to 80° C. in 2 l of demineralised water with stirring. When this temperature has been reached, 44 g of $TiCl_4$ solution (400 g/l of TiCl$_4$) is metered in at pH 1.8, during which the pH is kept constant using 32% sodium hydroxide solution. The pH is subsequently adjusted to pH 2.8 by means of sodium hydroxide solution, and 600 ml of an aqueous FeCl$_3$ solution (w(Fe)=7%) and 462 ml of an aqueous TiCl$_4$ solution (200 g of TiCl$_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of SiO$_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of SnCl$_4$×5 H$_2$O and 41 ml of hydrochloric acid (20%) is metered in. 105 ml of TiCl$_4$ solution (400 g/l of TiCl$_4$) are then slowly metered in at the same pH. A further addition of a solution consisting of 5 g of SnCl$_4$×5 H$_2$O and 41 ml of hydrochloric acid (20%) is subsequently carried out. The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous FeCl$_3$ solution (w(Fe)=7%) and 499 ml of an aqueous TiCl$_4$ solution (200 g of TiCl$_4$/l) and simultaneous titration with sodium hydroxide solution (w=10%). After stirring for a further 0.5 h at pH 3.0, the SiO$_2$ flakes coated in this way are filtered off, washed and dried at 110° C. for 16 h. Finally, the effect pigment is calcined at 850° C. for 0.5 h and sieved.

A temperature-stable golden multilayered pigment having high brightness and good hiding power is obtained.

Example 8

100 g of synthetic mica having a particle size of 10-40 μm are heated to 80° C. in 2 l of demineralised water with stirring. When this temperature has been reached, 44 g of TiCl$_4$ solution (400 g/l of TiCl$_4$) is metered in at pH 1.8, during which the pH is kept constant using 32% sodium hydroxide solution. The pH is subsequently adjusted to pH 2.8 by means of sodium hydroxide solution, and 600 ml of an aqueous FeCl$_3$ solution (w(Fe)=7%) and 462 ml of an aqueous TiCl$_4$ solution (200 g of TiCl$_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of SiO$_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of SnCl$_4$×5 H$_2$O and 41 ml of hydrochloric acid (20%) is metered in. 105 ml of TiCl$_4$ solution (400 g/l of TiCl$_4$) are then slowly metered in at the same pH. This is then followed by a further addition of a solution consisting of 5 g of SnCl$_4$×5 H$_2$O and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous FeCl$_3$ solution (w(Fe)=7%) and 499 ml of an aqueous TiCl$_4$ solution (200 g of TiCl$_4$/l) and simultaneous titration with sodium hydroxide solution (w=10%). After stirring for a further 0.5 h at pH 3.0, the coated mica substrate is filtered off, washed and dried at 110° C. for 16 h. Finally, the effect pigment obtained in this way is calcined at 850° C. for 0.5 h and sieved.

A temperature-stable golden multilayered pigment having high brightness and moderate hiding power is obtained.

Example 9

100 g of mica having a particle size of 10-60 μm are heated to 80° C. in 2 l of demineralised water with stirring. When this temperature has been reached, 44 g of TiCl$_4$ solution (400 g/l of TiCl$_4$) is metered in at pH 1.8, during which the pH is kept constant using 32% sodium hydroxide solution. The pH is subsequently adjusted to pH 2.8 by means of sodium hydroxide solution, and 1040 ml of an aqueous solution containing FeCl$_3$ (w(Fe)=4%) and TiCl$_4$ (95 g of TiCl$_4$/l) is added at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of SiO$_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of SnCl$_4$×5 H$_2$O and 41 ml of hydrochloric acid (20%) is metered in. 105 ml of TiCl$_4$ solution (400 g/l of TiCl$_4$) are then slowly metered in at the same pH. This is then followed by a further addition of a solution consisting of 5 g of SnCl$_4$×5 H$_2$O and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 1150 ml of a solution containing FeCl$_3$ (w(Fe)=4%) and TiCl$_4$ (95 g of TiCl$_4$/l) and simultaneous titration with sodium hydroxide solution (w=10%). After stirring for a further 0.5 h at pH 3.0, the mica substrate coated in this way is filtered off, washed and dried at 110° C. for 16 h. Finally, the effect pigment obtained in this way is calcined at 850° C. for 0.5 h and sieved.

A temperature-stable golden multilayered pigment having high brightness is obtained.

Example 10

100 g of natural mica having a particle size of 5-40 μm are heated to 80° C. in 2 l of demineralised water with stirring. When this temperature has been reached, 44 g of TiCl$_4$ solution (400 g/l of TiCl$_4$) is metered in at pH 1.8, during which the pH is kept constant using 32% sodium hydroxide solution. The pH is subsequently adjusted to pH 2.8 by means of sodium hydroxide solution, and 600 ml of an aqueous FeCl$_3$ solution (w(Fe)=7%) and 462 ml of an aqueous TiCl$_4$ solution (200 g of TiCl$_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of SiO$_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of SnCl$_4$×5 H$_2$O and 41 ml of hydrochloric acid (20%) is metered in. 105 ml of TiCl$_4$ solution (400 g/l of TiCl$_4$) are then slowly metered in at the same pH. This is then followed by a further addition of a solution consisting of 5 g of SnCl$_4$×5 H$_2$O and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the coated mica substrate is filtered off, washed and dried at 110° C. for 16 h. Finally, the effect pigment obtained in this way is calcined at 850° C. for 0.5 h and sieved.

A temperature-stable golden multilayered pigment having high brightness and a fine texture is obtained.

Example 11

100 g of talc having a particle size <10 μm are heated to 80° C. in 2 l of demineralised water with stirring. When this temperature has been reached, 44 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 600 ml of an aqueous $FeCl_3$ solution (w(Fe)=7%) and 462 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. This is then followed by a further addition of a solution consisting of 5 g of $SnCl_4 \times 5\ H_2O$ and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the talc flakes coated in this way are filtered off, washed and dried at 110° C. for 16 h. Finally, the effect pigment obtained in this way is calcined at 850° C. for 0.5 h and sieved.

A temperature-stable golden multilayered pigment having high hiding power is obtained.

Example 12

100 g of natural mica having a particle size of 10-60 μm are heated to 85° C. in 2 l of demineralised water with stirring. When this temperature has been reached, 30 g of $FeCl_3$ solution (w(Fe)=14%) is metered in at pH 3.1, during which the pH is kept constant using 32% sodium hydroxide solution. The pH is subsequently adjusted to pH 2.8 by means of sodium hydroxide solution, and 600 ml of an aqueous $FeCl_3$ solution (w(Fe)=7%) and 462 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. This is then followed by a further addition of a solution consisting of 5 g of $SnCl_4 \times 5\ H_2O$ and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the coated mica substrate is filtered off, washed and dried at 110° C. for 16 h. Finally, the effect pigment obtained in this way is calcined at 850° C. for 0.5 h and sieved.

A temperature-stable reddish, golden multilayered pigment having high brightness is obtained.

Example 13

100 g of natural mica flakes having a particle size of 10-60 μm are heated to 75° C. in 2 l of demineralised water with stirring. When this temperature has been reached, 50 g of $CrCl_3$ solution (w($CrCl_3$)=19% is metered in at pH 5.9, during which the pH is kept constant using 32% sodium hydroxide solution. The pH is subsequently adjusted to pH 2.8 by means of sodium hydroxide solution, and 600 ml of an aqueous $FeCl_3$ solution (w(Fe)=7%) and 462 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5\ H_2O$ and 41 ml of hydrochloric acid (20%) is metered in. 105 ml of $TiCl_4$ solution (400 g/l of $TiCl_4$) are then slowly metered in at the same pH. This is then followed by a further addition of a solution consisting of 5 g of $SnCl_4 \times 5\ H_2O$ and 41 ml of hydrochloric acid (20%). The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the coated mica substrate is filtered off, washed and dried at 110° C. for 16 h. Finally, the effect pigment obtained in this way is calcined at 850° C. for 0.5 h and sieved.

A temperature-stable greenish, golden multilayered pigment having high brightness is obtained.

Example 14

100 g of $Al_2O_3$ flakes (doped with $TiO_2$) having a particle size of 5-30 μm are heated to 80° C. in 2 l of demineralised water with stirring. When this temperature has been reached, 44 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 600 ml of an aqueous $FeCl_3$ solution (w(Fe)=7%) and 462 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5$ $H_2O$ and 41 ml of hydrochloric acid (20%) is metered in. 105 ml of $TiCl_4$ solution (400 g/l of $TiCl_4$) are then slowly metered in at the same pH. A further addition of a solution consisting of 5 g of $SnCl_4 \times 5$ $H_2O$ and 41 ml of hydrochloric acid (20%) is subsequently carried out. The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the $Al_2O_3$ flakes coated in this way are filtered off, washed and dried at 110° C. for 16 h. Finally, the effect pigment obtained is calcined at 850° C. for 0.5 h and sieved.

A temperature-stable golden multilayered pigment having a strong glitter effect is obtained.

Example 15

100 g of $Al_2O_3$ flakes (doped with $ZrO_2$) having a particle size of 5-30 µm are heated to 80° C. in 2 l of demineralised water with stirring. When this temperature has been reached, 44 g of $TiCl_4$ solution (400 g/l of $TiCl_4$) is metered in at pH 1.8, during which the pH is kept constant using 32% sodium hydroxide solution. The pH is subsequently adjusted to pH 2.8 by means of sodium hydroxide solution, and 600 ml of an aqueous $FeCl_3$ solution (w(Fe)=7%) and 462 ml of an aqueous $TiCl_4$ solution (200 g of $TiCl_4$/l) are added simultaneously at this pH and 75° C. Throughout the addition time, the pH is kept constant by simultaneous dropwise addition of a 32% sodium hydroxide solution. After stirring for a further 0.5 h, the pH is raised to 7.5, and 650 ml of sodium water-glass solution (13% by weight of $SiO_2$) are slowly metered in at this pH, during which the pH is kept constant using 10% hydrochloric acid. After stirring for a further 0.5 h, the pH is lowered to pH 1.8 using 10% hydrochloric acid, and a solution of 5 g of $SnCl_4 \times 5$ $H_2O$ and 41 ml of hydrochloric acid (20%) is metered in. 105 ml of $TiCl_4$ solution (400 g/l of $TiCl_4$) are then slowly metered in at the same pH. A further addition of a solution consisting of 5 g of $SnCl_4 \times 5$ $H_2O$ and 41 ml of hydrochloric acid (20%) is subsequently carried out. The pH is in each case kept constant at 1.8 using 32% sodium hydroxide solution. The pH is subsequently adjusted to pH 2.8 again by means of sodium hydroxide solution. Finally, the outermost layer is applied by parallel addition of 650 ml of an aqueous $FeCl_3$ solution (w(Fe)=7%) and 499 ml of an aqueous $TiCl_4$ solution (200 g of $TiCl_4$/l) and simultaneous titration with sodium hydroxide solution (w=10%). After stirring for a further 0.5 h at pH 3.0, the $Al_2O_3$ flakes coated in this way are filtered off, washed and dried at 110° C. for 16 h. Finally, the effect pigment obtained is calcined at 850° C. for 0.5 h and sieved.

A temperature-stable golden multilayered pigment having a strong glitter effect is obtained.

The golden multilayered pigments of Examples 1 to 15 are all stable at temperatures of ≥1000° C. and exhibit no impairment with respect to the optical properties at these temperatures.

The invention claimed is:

1. An effect pigment based on a multicoated flake-form substrate, wherein a surface of the substrate has at least one layer sequence comprising:
   (A) a base layer comprising a high-refractive-index coating having a refractive index of n≥1.8;
   (B) a pseudobrookite layer, which may optionally be doped with one or more oxides in amounts of ≤10% by weight, based on the weight of layer (B);
   (C) a low-refractive-index layer having a refractive index of n<1.8;
   (D) a high-refractive-index layer having a refractive index of n>1.8 and consisting of at least 2 different colorless metal-oxide layers;
   (E) a pseudobrookite layer, which may optionally be doped with one or more oxides in amounts of ≤10% by weight, based on the weight of layer (E); and optionally
   (F) an outer protective layer;
   wherein layers (C) and (D) have a total combined layer thickness of 50-115 nm, separating layer (B) from layer (E), and
   wherein no phase reactions occur between the individual layers (A) to (F), even at a temperature that is above 900° C.

2. The effect pigment of claim 1, wherein the flake-form substrate is selected from the group consisting of phyllosilicate, BiOCl, SiC, TiC, WC, $B_4C$, BN, graphite, $TiO_2$, $Fe_2O_3$ flakes, doped or undoped $Al_2O_3$ flakes, doped or undoped glass flakes, doped or undoped $SiO_2$ flakes, and mixtures thereof.

3. The effect pigment of claim 1, wherein the phyllosilicate comprises natural mica, synthetic mica, kaolin or talc.

4. The effect pigment of claim 1, wherein layer (A) comprises one or more metal oxides.

5. The effect pigment of claim 4, wherein the metal oxide of layer (A) is selected from the group consisting of $TiO_2$, $Fe_2O_3$, $Fe_3O_4$, Fe(O)OH, BiOCl, $Cr2O3$, ZnO, $Ce_2O_3$, $ZrO_2$, $SnO_2$, $Co_2O_3$, Ti suboxides, titanium oxynitrides, titanium nitride, CoO, $Co_2O_3$, $Co_3O_4$, $VO_2$, $V_2O_3$, NiO, $WO_3$, MnO, $Mn_2O_3$, and mixtures of the said oxides.

6. The effect pigment of claim 1, wherein layer (B) and/or layer (E) is doped with one or more oxides or oxide mixtures selected from the group consisting of $Al_2O_3$, $Ce_2O_3$, $B_2O_3$, $ZrO_2$, $SnO_2$, $Cr_2O_3$, CoO, $Co_2O_3$, $Co_3O_4$, and $Mn2O_3$.

7. The effect pigment of claim 1, wherein layer (C) comprises $SiO_2$, $MgO*SiO_2$, $CaO*SiO_2$, $Al_2O_3*SiO_2$, $B_2O_3*SiO_2$, or of a mixture of the said compounds.

8. The effect pigment of claim 1, wherein layer (D) comprises at least two metal-oxide layers, where the metal oxides are selected from the group consisting of $SnO_2$, $TiO_2$, $Al_2O_3$, $Cr_2O_3$, $Fe_2O_3$, and mixtures thereof.

9. The effect pigment of claim 1, wherein layer (D) comprises metal-oxide layers (D1) and (D2):
   (D1) $SnO_2$ layer:
   (D2) $TiO_2$ layer.

10. The effect pigment of claim 1, wherein layer (D) comprises metal-oxide layers (D1), (D2) and (D3):

(D1) Al$_2$O$_3$ layer;
(D2) TiO$_2$ layer; and
(D3) Al$_2$O$_3$ layer.

11. The effect pigment of claim 1, wherein layer (D) comprises metal-oxide layers (D1), (D2) and (D3):
(D1) SnO$_2$ layer
(D2) TiO$_2$ layer; and
(D3) SnO$_2$ layer.

12. The effect pigment of claim 1, wherein layers (B) and (E) have an equal layer thicknesses.

13. The effect pigment of claim 1, wherein the outer protective layer (F) comprises SnO$_2$.

14. The effect pigment of claim 1, having at least one of the following structures:
substrate+TiO$_2$+pseudobrookite+SiO$_2$+SnO$_2$+TiO$_2$+SnO$_2$+pseudobrookite;
substrate+Fe$_2$O$_3$+pseudobrookite+SiO$_2$+SnO$_2$+TiO$_2$+SnO$_2$+pseudobrookite;
substrate+Cr$_2$O$_3$+pseudobrookite+SiO$_2$+SnO$_2$+TiO$_2$+SnO$_2$+pseudobrookite;
substrate+TiO$_2$+pseudobrookite+MgO*SiO$_2$+SnO$_2$+TiO$_2$+SnO$_2$+pseudobrookite;
substrate+Fe$_2$O$_3$+pseudobrookite+MgO*SiO$_2$+SnO$_2$+TiO$_2$+SnO$_2$+pseudobrookite;
substrate+Cr$_2$O$_3$+pseudobrookite+MgO*SiO$_2$+SnO$_2$+TiO$_2$+SnO$_2$+pseudobrookite;
substrate+TiO$_2$+pseudobrookite+CaO*SiO$_2$+SnO$_2$+TiO$_2$+SnO$_2$+pseudobrookite;
substrate+Fe$_2$O$_3$+pseudobrookite+CaO*SiO$_2$+SnO$_2$+TiO$_2$+SnO$_2$+pseudobrookite;
substrate+Cr$_2$O$_3$+pseudobrookite+CaO*SiO$_2$+SnO$_2$+TiO$_2$+SnO$_2$+pseudobrookite;
substrate+TiO$_2$+pseudobrookite+Al$_2$O$_3$*SiO$_2$+SnO$_2$+TiO$_2$+SnO$_2$+pseudobrookite;
substrate+Fe$_2$O$_3$+pseudobrookite+Al$_2$O$_3$*SiO$_2$+SnO$_2$+TiO$_2$+SnO$_2$+pseudobrookite;
substrate+Cr$_2$O$_3$+pseudobrookite+Al$_2$O$_3$*SiO$_2$+SnO$_2$+TiO$_2$+SnO$_2$+pseudobrookite;
substrate+TiO$_2$+pseudobrookite+SiO$_2$+TiO$_2$+SnO$_2$+pseudobrookite;
substrate+TiO$_2$+pseudobrookite+SiO$_2$+SnO$_2$+TiO$_2$+pseudobrookite;
substrate+TiO$_2$+pseudobrookite+SiO$_2$+TiO$_2$+SnO$_2$+pseudobrookite+SnO$_2$;
substrate+TiO$_2$+pseudobrookite+SiO$_2$+SnO$_2$+TiO$_2$+pseudobrookite+SnO$_2$;
substrate+TiO$_2$+pseudobrookite+SiO$_2$+SnO$_2$+Fe$_2$O$_3$+SnO$_2$+pseudobrookite;
substrate+TiO$_2$+pseudobrookite+SiO$_2$+SnO$_2$+Cr$_2$O$_3$+SnO$_2$+pseudobrookite; or
substrate+TiO$_2$+pseudobrookite+SiO$_2$+Al$_2$O$_3$+TiO$_2$+Al$_2$O$_3$+pseudobrookite.

15. A paint, coating, printing ink, security printing ink, plastic, ceramic material, ceramic colour, glaze, engobe, enamel, glass, absorber for laser marking of plastics and papers, cosmetic formulation, pigment preparation, ordry preparation comprising the effect pigment of claim 1.

16. A formulation comprising the effect pigment of claim 1.

17. The formulation of claim 16, comprising the effect pigment and at least one constituent selected from the group consisting of absorbents, astringents, antimicrobial substances, antioxidants, antiperspirants, antifoaming agents, antidandruff active compounds, antistatics, binders, biological additives, bleaches, chelating agents, deodorisers, emollients, emulsifiers, emulsion stabilisers, dyes, humectants, film formers, fillers, fragrances, flavours, insect repellents, preservatives, corrosion-protection agents, cosmetic oils, solvents, oxidants, plant constituents, buffer substances, reducing agents, surfactants, propellant gases, opacifiers, UV filters, UV absorbers, denaturing agents, aloe vera, avocado oil, coenzyme Q10, green tea extract, viscosity regulators, perfume, inorganic pigments, metal pigments, ceramic pigments, functional pigments, ceramic colour bodies, functional pigments, and vitamins.

* * * * *